US008144659B2

(12) United States Patent
Yamamoto et al.

(10) Patent No.: US 8,144,659 B2
(45) Date of Patent: Mar. 27, 2012

(54) HANDOVER PROCESSING SYSTEM IN MOBILE COMMUNICATION SYSTEM

(75) Inventors: Keiji Yamamoto, Ome (JP); Fuminori Kishino, Koganei (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1057 days.

(21) Appl. No.: 11/482,070

(22) Filed: Jul. 7, 2006

(65) Prior Publication Data

US 2007/0008931 A1    Jan. 11, 2007

(30) Foreign Application Priority Data

Jul. 7, 2005   (JP) ................................. 2005-198907

(51) Int. Cl.
*H04W 4/00* (2009.01)

(52) U.S. Cl. ........ 370/331; 370/401; 370/338; 370/329; 370/352; 455/436; 455/445; 455/522; 455/439

(58) Field of Classification Search ............... 455/436, 455/439, 445, 168, 522; 370/331, 401, 338, 370/329, 352
See application file for complete search history.

(56) References Cited

U.S. PATENT DOCUMENTS

| | | | |
|---|---|---|---|
| 5,910,946 A * | 6/1999 | Csapo ........................... | 370/328 |
| 6,614,902 B1 | 9/2003 | Rizzetto | |
| 6,795,444 B1 | 9/2004 | Vo et al. | |
| 6,940,848 B1 | 9/2005 | Liu et al. | |
| 7,369,522 B1 | 5/2008 | Soininen et al. | |
| 2002/0085516 A1* | 7/2002 | Bridgelall ..................... | 370/329 |
| 2002/0110104 A1* | 8/2002 | Surdila et al. ................. | 370/338 |
| 2003/0027595 A1* | 2/2003 | Ejzak ............................. | 455/560 |
| 2003/0091011 A1 | 5/2003 | Roberts et al. | |
| 2003/0185202 A1* | 10/2003 | Maenpaa ....................... | 370/352 |
| 2003/0185387 A1* | 10/2003 | Huang .......................... | 379/413.02 |
| 2004/0196810 A1* | 10/2004 | Kil et al. ....................... | 370/331 |
| 2005/0053034 A1* | 3/2005 | Chiueh ......................... | 370/331 |
| 2005/0130659 A1 | 6/2005 | Grech et al. | |

(Continued)

FOREIGN PATENT DOCUMENTS

JP    2002-517948    6/2002

(Continued)

OTHER PUBLICATIONS

Notice of Reasons for Rejection issued by the Japanese Patent Office on Jun. 10, 2008, for Japanese Patent Application No. 2005-198907, and English-language translation thereof.

(Continued)

*Primary Examiner* — Nick Corsaro
*Assistant Examiner* — Mahendra Patel
(74) *Attorney, Agent, or Firm* — Finnegan, Henderson, Farabow, Garrett & Dunner, L.L.P.

(57) ABSTRACT

A handover processing system in mobile communication system, implemented in gateway connected to subscriber network including base station in the mobile communication system, public network and IP network and accompanied by movement of radio terminal in the mobile communication system, wherein the gateway comprises line exchanger performing line exchange processing, VoIP connection unit controlling communication function to transmit/receive IP-packetized data to make communication and call control function for the VoIP communication function, handover detector determining whether or not call originating request from the base station is handover call, communication call detector determining whether or not communication source call of handover is present, call information storage unit storing call information, handover source call retriever retrieving handover source call in IP network, and handover processor taking over communication call from communication partner to continue the communication, and performing handover processing of VoIP communication call.

8 Claims, 7 Drawing Sheets

U.S. PATENT DOCUMENTS

| | | |
|---|---|---|
| 2005/0243803 A1* | 11/2005 | Fang .......................... 370/352 |
| 2005/0271015 A1* | 12/2005 | Nishida et al. ............... 370/331 |
| 2005/0286466 A1 | 12/2005 | Tagg et al. |
| 2005/0286471 A1 | 12/2005 | Yang et al. |
| 2006/0007914 A1 | 1/2006 | Chandra et al. |
| 2006/0116127 A1* | 6/2006 | Wilhoite et al. ............ 455/442 |
| 2006/0121916 A1* | 6/2006 | Aborn et al. ............... 455/456.5 |
| 2006/0126614 A1* | 6/2006 | Logan ......................... 370/389 |
| 2007/0127507 A1* | 6/2007 | Aluf-Medina ................ 370/401 |

FOREIGN PATENT DOCUMENTS

| | | |
|---|---|---|
| JP | 2004-56336 | 2/2004 |
| JP | 20050-27119 A | 1/2005 |
| JP | 2005-117663 | 4/2005 |
| JP | 2006-519553 | 8/2006 |
| WO | WO 01/93608 A1 | 12/2001 |
| WO | WO 02/17670 A1 | 2/2002 |
| WO | WO 2004/073279 A1 | 8/2004 |

OTHER PUBLICATIONS

Notification of Reasons for Rejection mailed Oct. 30, 2007, in corresponding Japanese Application No. 2005-198907.

Combined Search and Examination Report dated Oct. 6, 2006 in U.K. Patent Application No. GB 0613488.6.

* cited by examiner

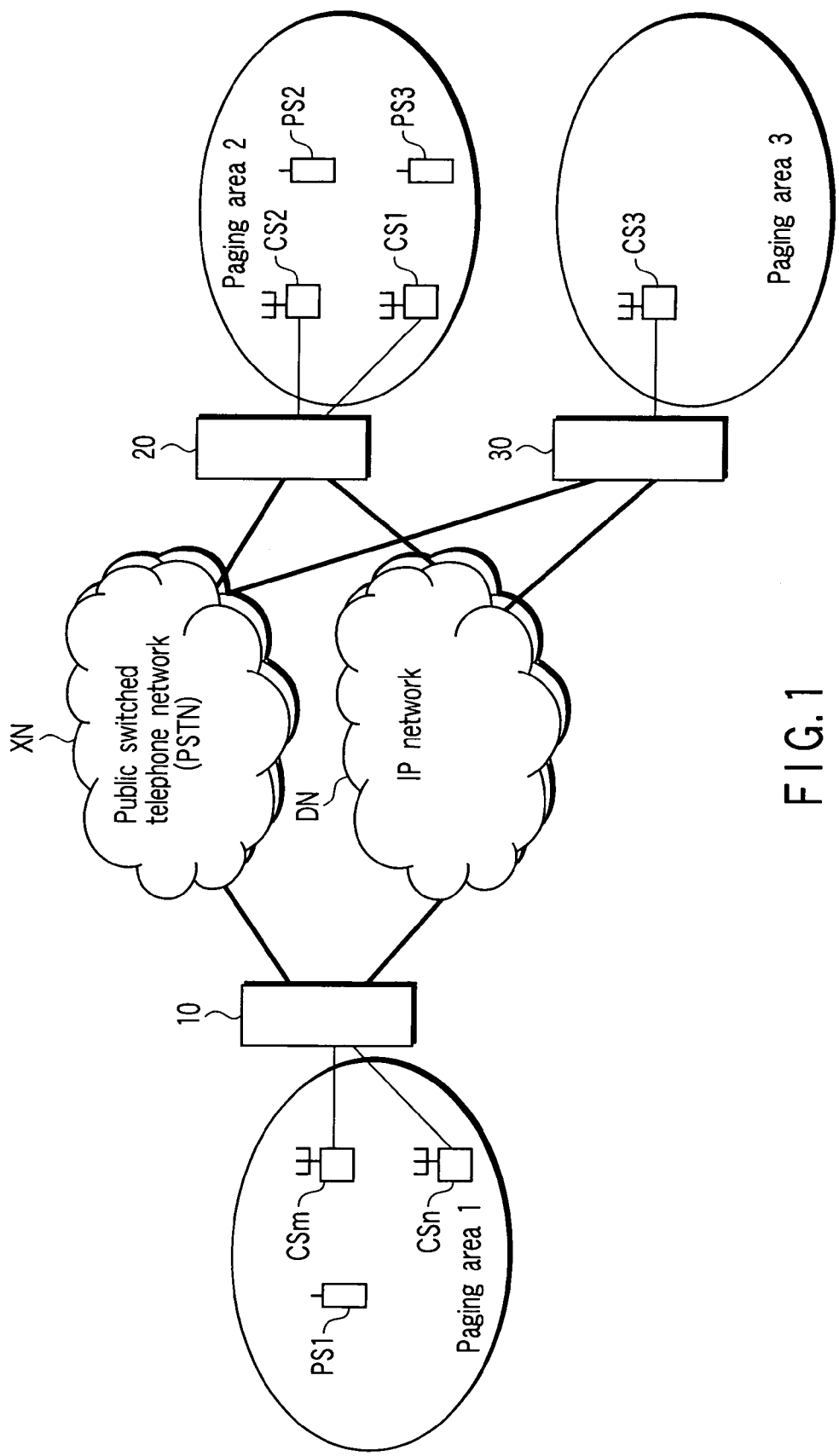
F I G. 1

| Call reference | Calling party number | Called party number | Call type |
|---|---|---|---|
| 1000 | 07011112222 | 07022223333 | VoIP |
| 2000 | 08011113333 | 0223334444 | Line exchange |
| ⋮ | ⋮ | ⋮ | ⋮ |

Call information database

FIG. 3

| IP address (or DN address) | Net mask (Corresponding to the case of IP address) |
|---|---|
| 172, 16, 1, 10 | 255, 255, 0, 0 |
| 172, 16, 1, 20 | 255, 255, 0, 0 |
| ⋮ | ⋮ |

Adjacent gateway information database

FIG. 7

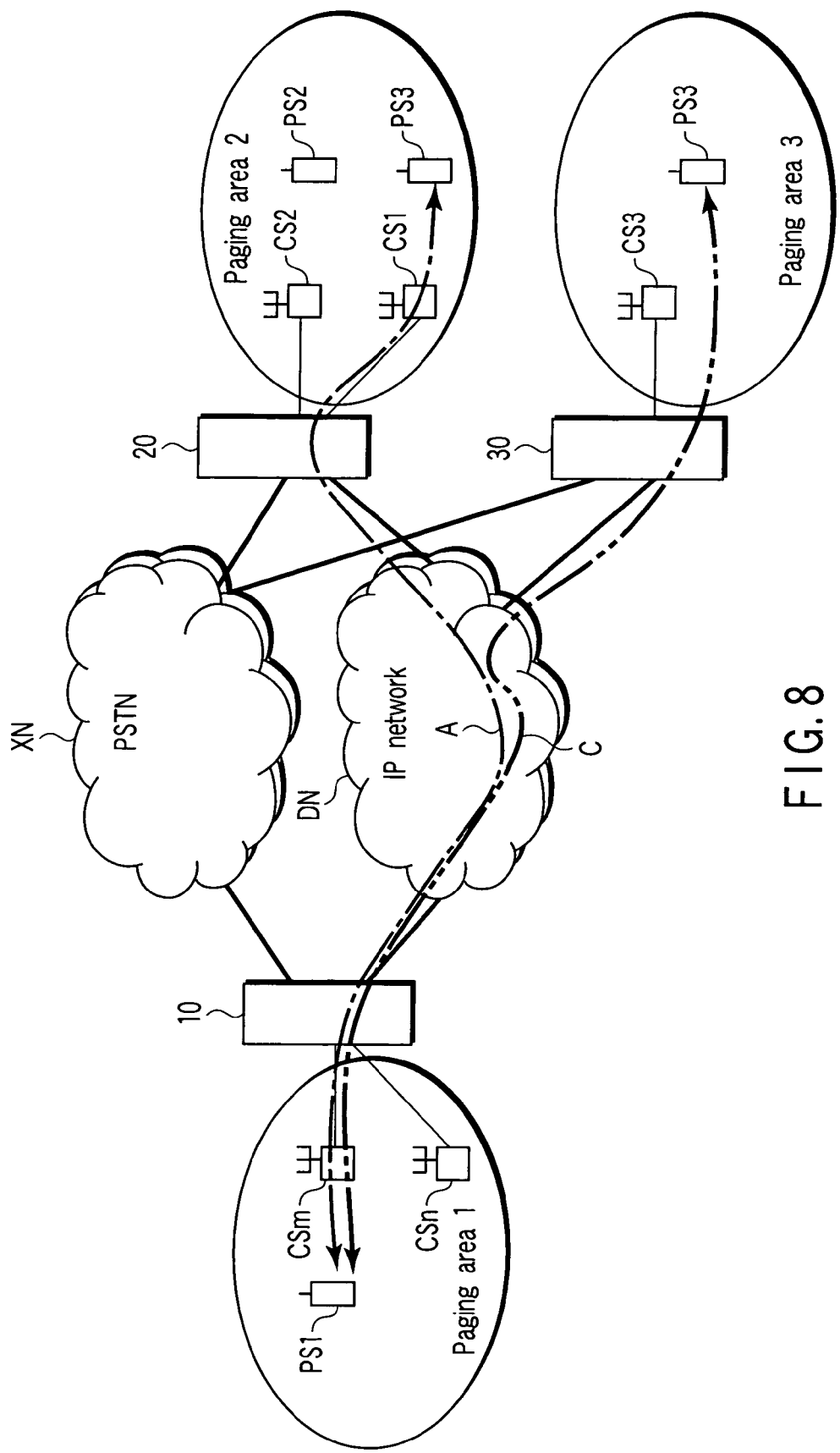
F I G. 8

HANDOVER PROCESSING SYSTEM IN MOBILE COMMUNICATION SYSTEM

CROSS-REFERENCE TO RELATED APPLICATIONS

This application is based upon and claims the benefit of priority from prior Japanese Patent Application No. 2005-198907, filed Jul. 7, 2005, the entire contents of which are incorporated herein by reference.

BACKGROUND OF THE INVENTION

1. Field of the Invention

The present invention relates to a handover processing system in a mobile communication system using a gateway device to connect a public switched telephone network (PSTN) and an Internet protocol (IP) network with each other.

2. Description of the Related Art

In recent years, information communication services including sound and data communications have diversified with the increase in information communication needs and with the liberalization of communications. Such background increases the number of carriers entering into the communication service field and raises service competition among the carriers. Each new carrier is called a new common carrier (NCC) and provides a variety of services by using a technology such as a voice over Internet protocol (VoIP). VoIP is a technology to integrate a sound-based network and a data-based network by packetizing digital sound data to transmit it (for instance, refer to Jpn. Pat. Appln. KOKAI Publication No. 2004-56336).

In many case, the NCC is able to loan facilities, such as an exchange, at a default rate from a specified carrier that owns a subscriber line. And many of the NCCs construct their own exchange networks, for example, IP networks using their own resources. Additionally adding a PSTN of the specified carrier to this exchange network forms a communication system. To provide services to general users, these facilities are utilized complexly. The NCC, obtaining the loan of the subscriber line, has to pay a line rental fee to the specified carrier at a flat rate and a pay-as-you-go rate in response to the use. Thus, a communication resource to be rented is minimized by setting up a gateway device between the subscriber network and the PSTN and by flowing traffic on the side of the IP network.

Incidentally, position information about a radio terminal (information indicating a service area being present in a specific are) is managed by the specified carrier. Thereby, the position information of the radio terminal not known in the IP network, handover processing (processing to change base station with which radio terminal communicates, also refereed to as handoff) is matched with the movement of the radio terminal.

As mentioned above, the flow of traffic to the side of the IP network by setting the gateway device to decrease charging from a carrier network has been presented. In the mobile communication system; however, being impossible to utilize information about the specified carrier in performing the handover processing in the mobile communication system, a failure involving handover accompanied by the movement of the radio terminal occurs.

BRIEF SUMMARY OF THE INVENTION

According to an aspect of the present invention, there is provided a handover processing system in a mobile communication system, which is implemented in a gateway device connected to a subscriber network including a base station in the mobile communication system, a public network and an internet protocol (IP) network and is accompanied by a movement of a radio terminal in the mobile communication system, wherein the gateway device comprises: a line exchange connection unit performing line exchange processing; a voice over IP (VoIP) connection unit controlling a communication function to transmit/receive IP-packetized sound data to/from the IP network to make a communication and a call control function for the VoIP communication function; a handover detection unit determining whether or not a call originating request from the base station is a handover call; a communication call detection unit determining whether or not a communication source call of handover is present in its own device; a call information storage unit storing call information including caller information, recipient information, call references and call types; a handover source call retrieval unit retrieving a handover source call in the IP network; and a handover processing unit taking over a communication call from a communication partner to continue the communication, and performing handover processing of a VoIP communication call in the IP network.

With implementation of such a means, a call becoming a source of handover processing in an IP network (hereinafter referred to as handover source call) is retrieved, and the handover processing caused by a movement of a radio terminal is realized by autonomous processing of a gateway device. According to the present invention, the handover processing becomes enabled to be performed uniquely in the IP network. Thus, a handover processing system in a mobile communication system capable of providing a flexible service to a subscriber is provided.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is an exemplary system view showing an embodiment of a communication system to which a handover processing system is applied regarding the present invention;

FIG. 3 is an exemplary schematic view showing a call information database stored in the gateway devices 10, 20 and 30;

FIG. 7 is an exemplary schematic view showing an adjacent gateway information database stored in the gateway devices 10, 20 and 30 in FIG. 2;

FIG. 8 is an exemplary view for explaining a handover system regarding the present invention.

DETAILED DESCRIPTION OF THE INVENTION

Figure 2:
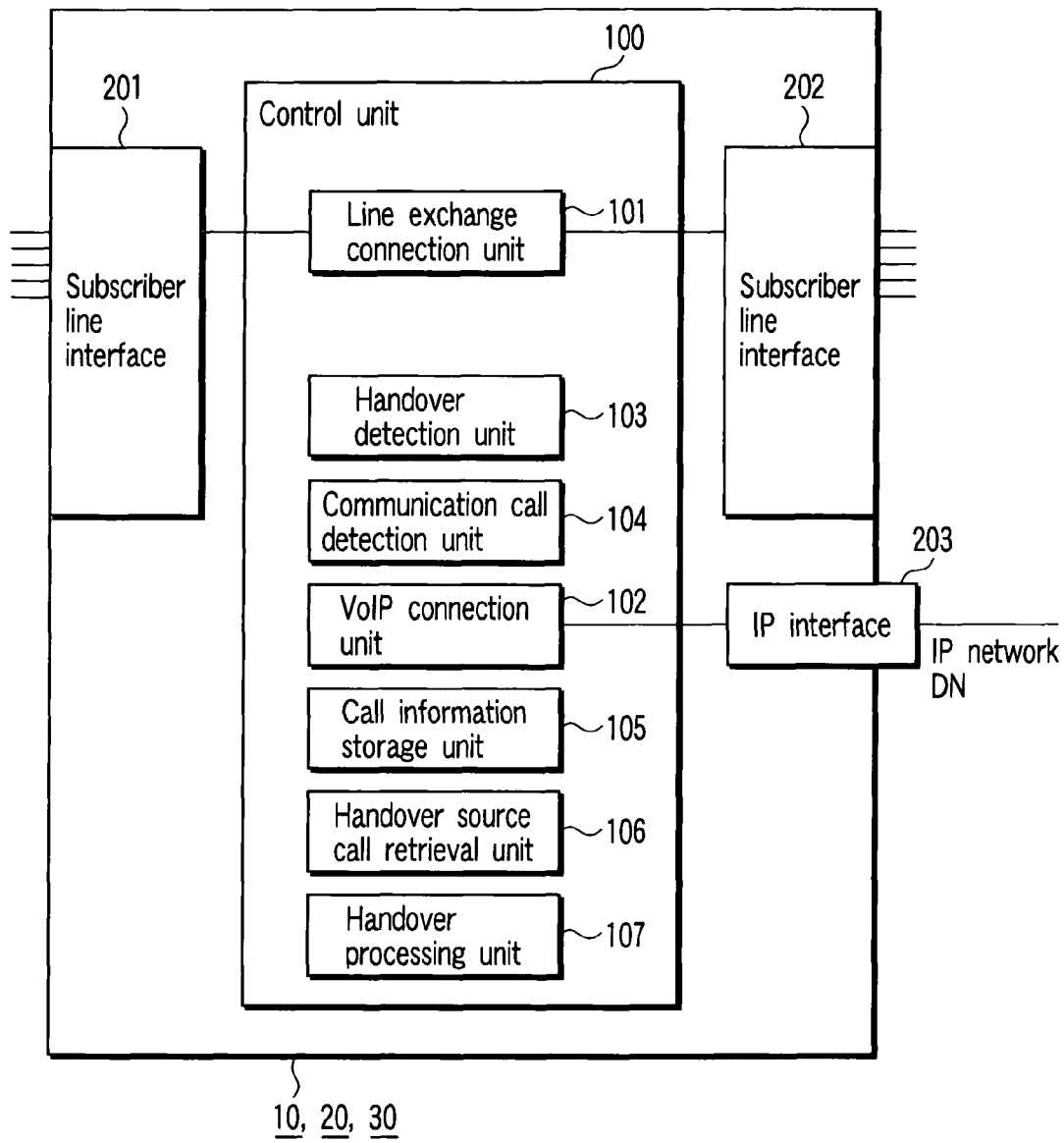
FIG. 2 is an exemplary functional block diagram showing gateway devices 10, 20 and 30 in FIG. 1.

FIG. 1 is the system view showing the embodiment of the communication system to which the handover processing system is applied regarding the present invention. The system includes gateway devices 10, 20 and 30 of all of which are connected to a PSTN XN and an IP network DN. The gateway device 10 is connected to base stations CSn and CSm forming a call area 1 of a mobile communication system. The gateway device 20 is connected to base stations CS1 and CS2 forming a call area 2, and the gateway device 30 is connected to a base station CS3 forming a call area 3. Each radio terminal PS (PS1-PS3) connects a base station CS thereto via a radio protocol in the call area and connects a communication partner thereto via lines among the gateway devices 10-30. The IP network DN is a packet communication network such as a wide Ethernet (registered trademark) and a IP-VPN connection service and is formed as a unique network of an NCC.

Each gateway device 10, 20 and 30 distributes signals (digital signal such as sound data and video and image data) transmitted from the base stations CSs to either the PSTN XN or the IP network DN to transmit them. The gateway devices 10, 20 and 30 transmit signals addressed to radio terminals PSs from the PSTN XN and the IP network DN toward the base stations CSs so that they arrive at the corresponding radio terminals. Thereby, the communication system can arbitrarily set radio terminals belonging to the PSTH XN and the IP network DN and interactive communication channels.

FIG. 2 is a functional block diagram showing gateway devices 10, 20 and 30. In FIG. 2, a subscriber line interface 201 is connected to the side of the base station CS and a subscriber line interface 202 is connected to the PSTN XN. An IP interface 203 is connected to the IP network DN. Any of the interfaces 201-203 is connected to a control unit 100. The control unit 100 includes a line exchange connection unit 101, a VoIP connection unit 102, a handover detection unit 103, a communication call detection unit 104, a call information storage unit 105, a handover source call retrieval unit 106 and a handover processing unit 107.

Out of these units, the exchange connection unit 101 is connected to the subscriber line interfaces 201 and 202 to achieve line exchange connections. The VoIP connection unit 102 makes a communication by receiving/transmitting sound data IP-packetized by the IP interface 203. The VoIP connection unit 102 also conducts call control processing for a VoIP communication function. The handover detection unit 103 determines whether or not a call originating request from the base station CS is a handover call origination. The communication call detection unit 104 determines whether or not a communication call of a source (hereinafter referred to as communication source call) of handover is present in its own device. The call information storage unit 105 stores call information including caller information, recipient information, call references and call types. Specifically, the foregoing information is managed in a form such as a call information database shown in FIG. 3. In the call information database, the call information is managed by associating the call reference to identify a call during connection with a calling party number (call originating number), a called party number (call incoming number) and its call type, respectively. If the communication source call of the handover is not present in its own device, the handover source call retrieval unit 106 retrieves the source call of the handover in the IP network DN. The handover processing unit 107 takes over the communication call from the communication partner to continue the communication.

Figure 4:
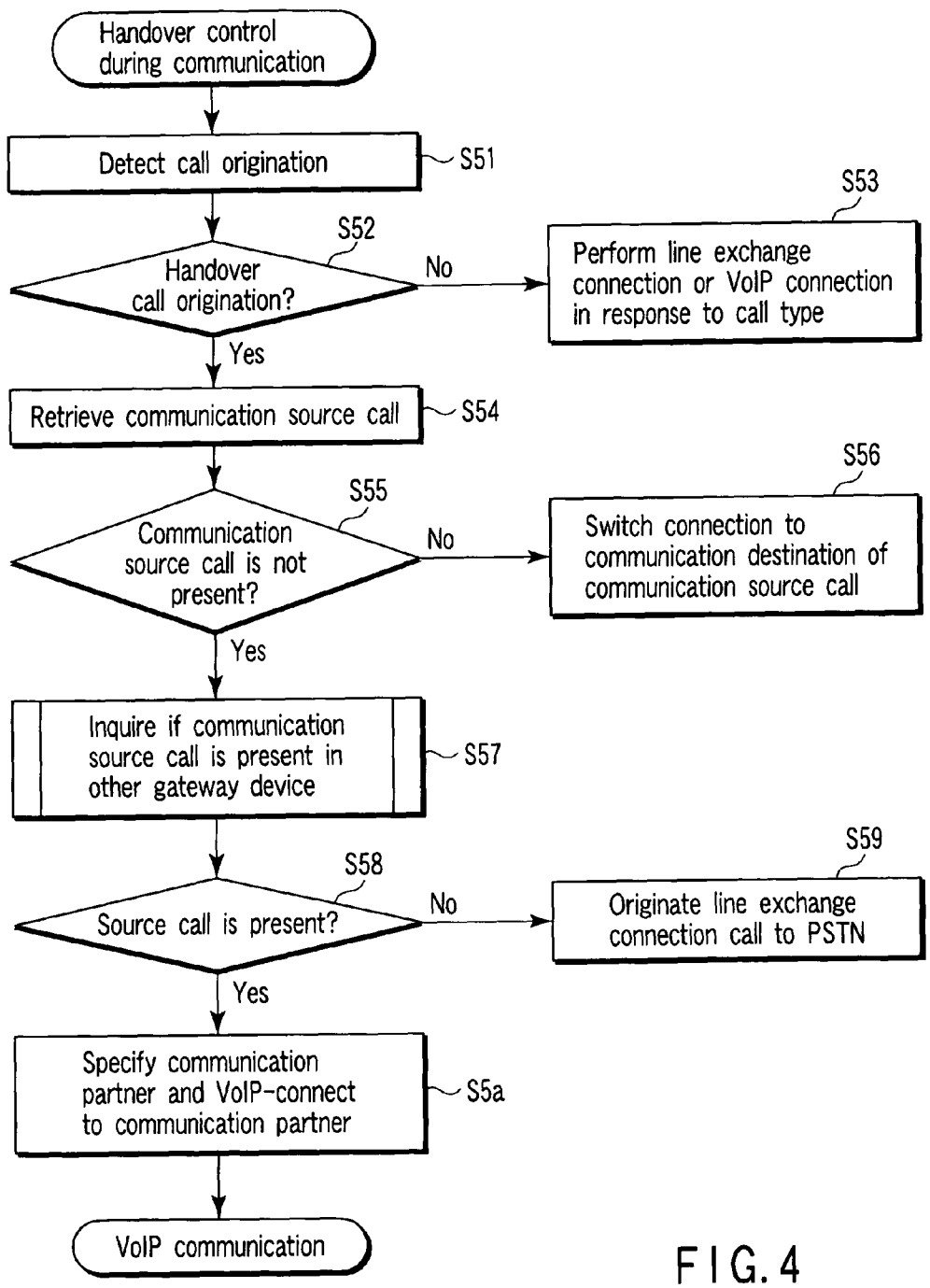
FIG. 4 is an exemplary processing flowchart showing handover processing in the gateway device 30 in FIG. 2.

FIG. 4 is an exemplary processing flowchart showing the handover processing in the gateway device 30 in FIG. 2. The same processing is also carried out in other gateways. In FIG. 4, when the gateway device 30 detects call origination (step S51), it determines whether the call origination is a handover call or not (step S52). If it is not a handover call but an usual call, the gateway device 30 performs a line exchange connection or VoIP connection in response to the call type (step S53).

In the step S52, when determining the handover call, the gateway device 30 retrieves the call information database (FIG. 3) to determine whether or not a source call of a communication is present in its own device (step S54). If the communication source call is managed in its own device (N in step S55), the gateway device 30 conducts line switching and disconnects the connection on the side of the base station CS of the source to perform the handover processing (step S56). If the communication source call is not present (Y in step S55), (the radio terminal having been handed over from an adjacent gateway device) the gateway device 30 acquires information about adjacent gateway devices to inquire as to whether the communication source call is present or not (step S57).

If the interrogated gateway device responds that the source call is not present (N in step S58), the gateway device 30 makes a handover call to the PSTN XN to perform the handover processing (step S59). Thereby, the handover processing utilizing the function of the PSTN XN is implemented. If the gateway device responds to the effect that the source call is present (Y in step S58), the gateway device 30 acquires information relating to the communication partner of the source call from the gateway device which has made the response to implement the handover connection with a communication partner gateway through the VoIp connection (step S5*a*).

Figure 5:
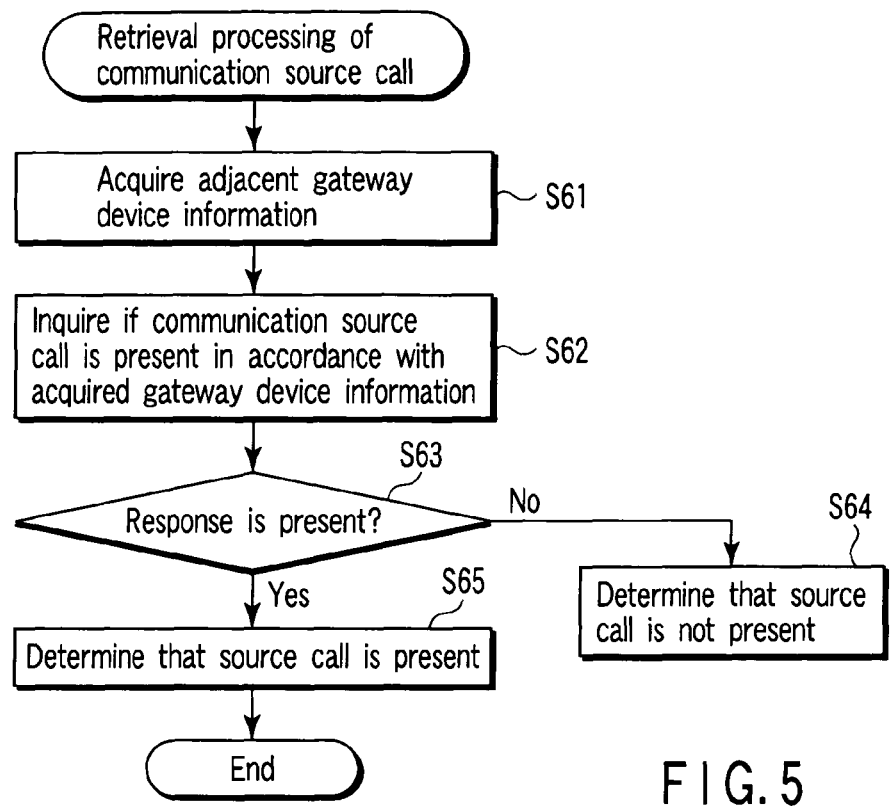
FIG. 5 is an exemplary flowchart showing an example of processing in a step S57 in FIG. 4.

FIG. 5 is a flowchart showing an example of the processing in the step S57 in FIG. 4. The gateway device 30 which has determined, in the step S55 in FIG. 4, that the source call is not present in its own device acquires address information of the adjacent gateway device (step S61). To conduct this processing, the gateway device 30 stores, in advance, an adjacent gateway information database as shown in FIG. 7 and acquires address information of the adjacent gateway device from the database. In the database, an IP address and a net mask of the adjacent gateway device is managed. The gateway device 30 interrogates an acquired address as to the presence/absence of a communication source call (step S62), and if no response is present (N in step S63), the gateway device 30 determines the absence of the source call (step S64), and if a response is present (Y in step S63), it determines the presence of the source call (step S65), and it acquires information of a communication partner gateway device connected to the gateway device which has made the response.

Figure 6:
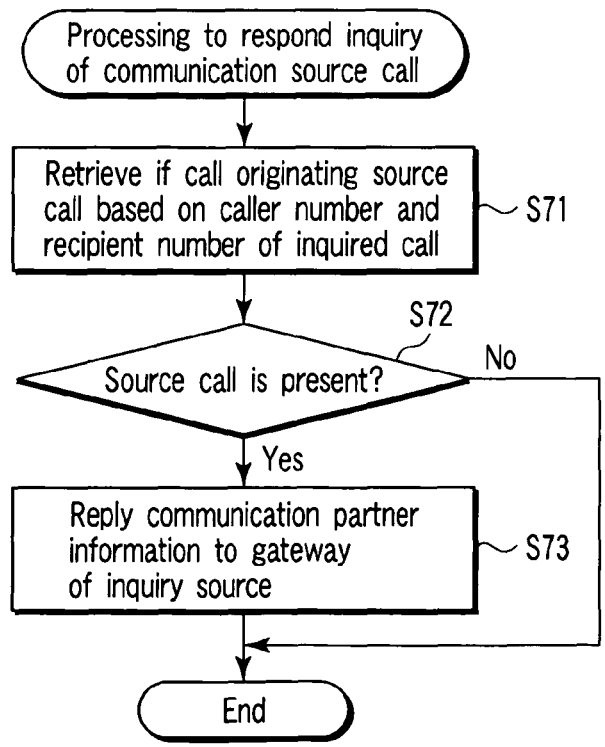
FIG. 6 is an exemplary flowchart showing a processing procedure in a gateway device which has received an inquiry of presence/absence of a communication source call.

FIG. 6 is an exemplary flowchart showing the processing procedure in the gateway device which has received an inquiry of the presence/absence of the communication source call. The gateway device which has been interrogated as regards the presence/absence of the communication source call retrieves whether the source call of the handover is present or not on the basis of the inquired calling party number and called party number (step S71). In the event of presence of the source call (Y in step S72) the gateway device 30 responds to the gateway device of the inquiry source (step S73).

FIG. 8 is a view for explaining the handover system configured as given above. After a VoIP connection using the IP network DN is established between radio terminal PS1 and the radio terminal PS3 (communication channel A), when the terminal PS3 moves to the call area 3, the terminal PS3 conducts a handover call to the base station CS3 and the base station CS3 transmits this handover call to the gateway device 30. If the handover source call is present in its own device, the gateway device 30 can maintain the connection with the base station CS; however, if the source call is not present therein, it inquires into the presence/absence of a handover source call to the adjacent gateway device. When receiving the reply of the presence of the source call, the gateway device 30 obtains a connection destination gateway device to make a VoIP connection therewith to conduct a handover connection (communication channel C). Thus, handover processing solely using a resource of the IP network DN is achieved. In other words, it becomes possible to perform handover processing by shutting the connection destination gateway device into the IP network DN and reduce a burden of charging accompanied by the handover processing.

As mentioned above, according to the present invention, after establishing the communication through the VoIP communication via the IP network DN, it becomes possible for the gateway device to autonomously implement handover processing caused by the movement of the radio terminal PS, without use of the PSTN XN. Therefore, this handover system does not require the PSTN XN resource in performing the handover, which reduces the burden of the charging.

In addition, as each gateway device is connected to the PSTN XN and IP network DN, the handover system can set the communication channel more freely and configure a failure-resistant communication system. Furthermore, the present invention can provide a communication system that is capable of enhancing economical efficiency by making traffic take an inexpensive IP network DN detour and responding to traffic demand flexibly and economically.

The present invention is not limited to the aforementioned embodiment. For instance, to acquire the address information of the gateway device to be inquired in the flowchart in FIG. 5, obtaining the address information from the IP address of its own device through a mathematical calculation, by arranging the adjacent gateway devices in accordance with a specified address pattern instead of the method for acquiring it from the adjacent gateway information database in FIG. 7, is a possible method. The handover processing system may set the adjacent sections possible to be brought into handover as identical networks and inquire in use of a broadcast message in the identical networks. In particular, this handover processing system can employ a multicast system. It is possible for the processing system to use the broadcast message also for the whole network area and to interrogate all gateway devices. The processing system, further, can acquire the position information of the radio terminal (for example, radio terminal PS3) and the corresponding gateway device information via the IP network DN to inquire to the server with the position information of the radio terminal stored therein.

Figure 9:
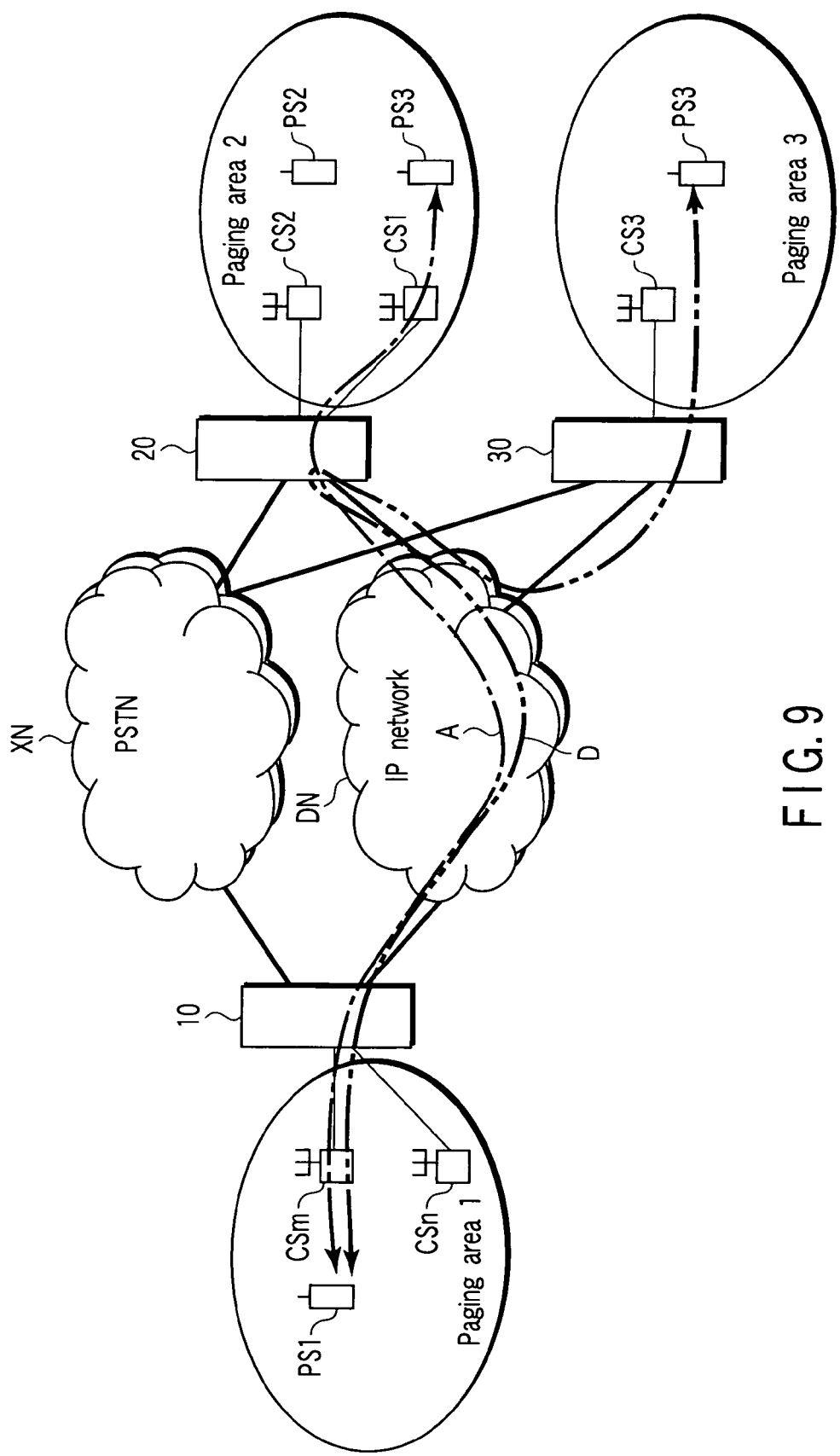
FIG. 9 is an exemplary view for explaining another handover system regarding the present invention.

As shown in FIG. 9, installing the gateway device that becomes an anchor is a possible configuration. FIG. 9 is a connection view for fixing a gateway device having a communication source call therein in implementing handover connection processing in the IP network DN and for performing connection processing as the anchor. In FIG. 9, the gateway device 20 is set as the anchor. In FIG. 9, the handover system may be configured so as to connect a new communication channel (communication channel D) while maintaining the connection to the source call (while fixing as anchor) when the gateway device 30 makes it clear that the source call is present in other gateways. To retrieve this anchor gateway device, a method such as the above-described method is usable.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A handover processing method performed by a first gateway connected to a PSTN, an IP network, and a mobile communications network including a base station arranged to receive a communication source call from a mobile terminal in the mobile communications network, in which the communication source code is retrieved in the IP network without use of the PSTN, the method comprising:
  receiving at the first gateway, from the base station, a communication request relating to the communication source call, which communication source call is either a voice over Internet (VoIP) or a line exchange type and determining whether the communication request is a handover call, and
    a1) on determination that the communication request is not a handover call, performing at the first gateway, without use of the PSTN, either a line exchange connection through the PSTN or a VoIP connection through the IP network depending upon the type of the communication source call; or
    a2) on determination that the communication source call is a handover call, determining, without use of the PSTN, whether the first gateway is managing the communication source call, and
      b1) on determination that the first gateway is managing the communication source call, retrieving the communication source call from the first gateway wholly within the IP network and performing at the first gateway, without use of the PSTN, handover through the PSTN or the IP network depending upon the type of the communication source call, the handover being performed by the gateway itself; or
      b2) on determination that the first gateway is not managing the communication source call, determining, without use of the PSTN, whether the communication source call is being managed by another gateway connected to the gateway via the IP network, and
        c1) on determination that the communication source call is not being managed by the other gateway, performing at the first gateway, without use of the PSTN, handover itself through the PSTN; or
        c2) on determination that the other gateway is managing the communication source call, retrieving the communication source call from the other gateway wholly within the IP network and performing handover at the first gateway without use of the PSTN and through the IP network by taking over management of the communication source call from the other gateway.

2. The method according to claim 1, in which adjacent and potential handover sections are identical networks, wherein:
the communication source call is retrieved by a broadcast message by designating all gateways in the IP networks as retrieval objects.

3. The method according to claim 1, further comprising:
inquiring to the gateways by a multicast message; and
wherein the communication source call is retrieved by designating gateways on a multicast network as retrieval objects.

4. The method according to claim 1, further comprising:
interrogating gateways in the IP network that are designated as retrieval objects and that cover a call area of the terminal and wherein;
the communication source call is retired by acquiring position information of the mobile terminal from a server storing position information of the terminal.

5. The method according to claim 1, further comprising:
assigning IP addresses to gateways in the IP network that are adjacent to each other in accordance with a prescribed assigning rule; and wherein
the communication source call is retrieved by interrogating adjacent gateways that are designated as retrieval objects in accordance with the assigning rule.

6. The method according to claim 1, further comprising:
reconstructing connections to communication partners between gateways by acquiring partner information of the communication source call from the other gateway and by directly communicating in relation to call control with the other gateway by a protocol on the IP network.

7. The method according to claim 1, further comprising:
when a gateway having the communication source call, transferring a call in accordance with a call control procedure to a communication partner gateway of the handover call and a gateway of a handover destination, wherein the gateway having the communication source call is arranged preliminarily to perform transfer processing of the call.

8. The method according to claim 1, further comprising:
providing a new link for call control by a protocol on the IP network to and from a gateway having the communication source call; and
performing a handover connection by directly communicating voice communications between a gateway of a handover destination and a communication partner gateway of the other gateway is designated as an anchor to transmit/receive call control information.

* * * * *